May 4, 1937. H. JORDAN 2,079,373
DEVICE FOR READING X-RAY FILMS
Filed Sept. 18, 1936
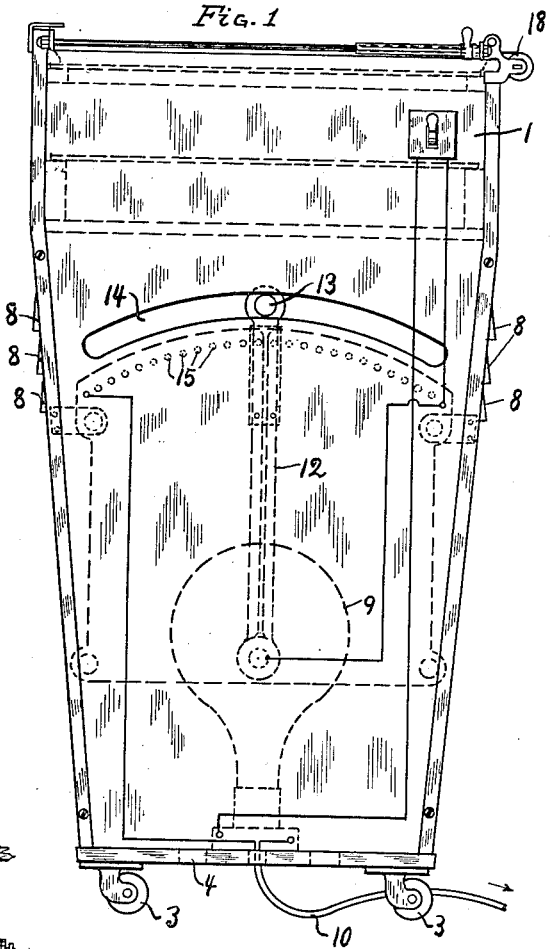
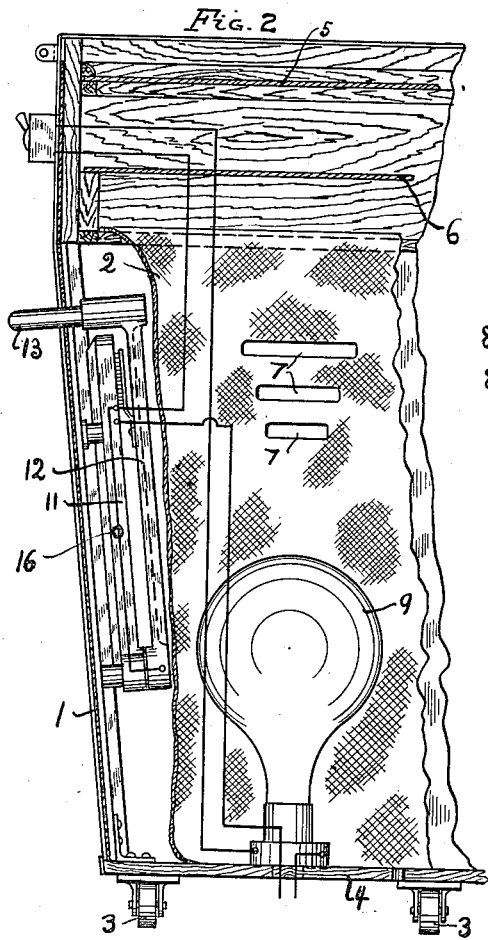
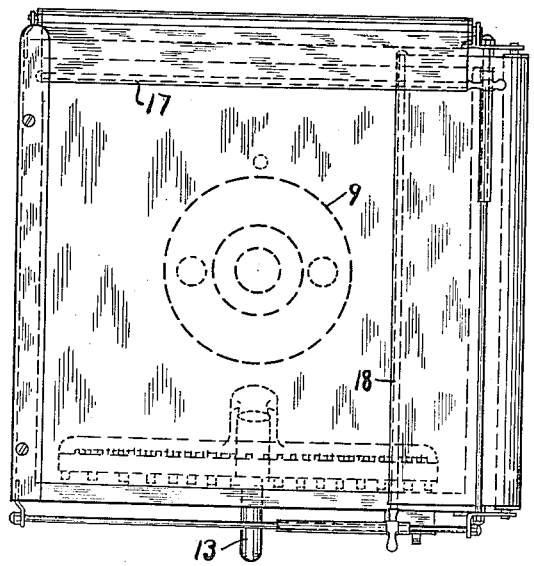
INVENTOR
HENRY JORDAN
BY:
Georg Benjamin
ATTORNEY Patented May 4, 1937

2,079,373

UNITED STATES PATENT OFFICE 2,079,373

DEVICE FOR READING X-RAY FILMS

Henry Jordan, New York, N. Y.

Application September 18, 1936, Serial No. 101,355

4 Claims. (Cl. 40—132)

Most of the devices for reading X-ray films and particularly the larger films used by physicians and surgeons, as distinguished from the small dentist's films, are horizontal i. e. a line connecting the center of the light source with the center of the film support is horizontal, and the film support, usually a glass plate, is arranged in vertical position.

Therefrom several heavy disadvantages result. For avoiding overheating of the film by the strong light source and for obtaining a uniform illumination of the film it should be located at a considerable distance from said source which is usually a powerful electric lamp. This long distance, however, has the consequence that for the device much floor space is necessary. For eliminating as much as possible this drawback it has even been proposed to connect the device by a hinged joint to the wall of the physician's room so that the device can be swung into close proximity to said wall when not in use.

At the other hand, the vertical arrangement of the film support and therefore of the film is very inconvenient in taking measurements and in making tracings from the film.

Therefore it has already been proposed to construct such devices vertically, so that the film support lies in horizontal position above the light source. These latter devices have the form of more or less flat boxes which must be put on a table, desk or other support for bringing the film support sufficiently near to the eye of the physicians. Thereby other disadvantages are caused, e. g. the flat form of the box makes it impossible to arrange the light source in sufficient distance from the film to secure a uniform illumination of the film. Therefore instead of the cheap electric bulb expensive special lamps have been proposed.

Furthermore, the small distance between the lamp and the film results in the danger of overheating the film and the box. This necessitated elaborate cooling devices consisting of air flues formed by a great number of superposed spaced glass plates and by hollow walls etc. Thereby, however, the desired purpose can not be attained because the heat of the lamp is radiating heat which can be kept away from the film neither by glass plates nor by air currents.

For these and other reasons only relatively small and not powerful lamps must be used for the devices of the latter kind.

Besides none of the known devices is of such construction and arrangement that it can be taken along through the wards on grand rounds in hospitals etc.

The device which is the object of this invention avoids all these disadvantages. To this end the device comprises a box or casing in the form of an upright column of about the height of a table, an electric light bulb of more than 1000 watts and preferably not less than 1500 watts near the bottom of said box, light diffusing means above said bulb and a substantially horizontal plate permeable for light at the upper end of said box. The device therefore has about the form of a German cast iron stove.

The long distance of the bulb from the film support makes it possible to use such a powerful bulb as a bulb of 1500 watts as already mentioned and results in a uniform direct illumination of the film by substantially parallel light rays.

For the same reason all the walls of the box or casing can be ordinary solid cheap metal walls in distinction from the above mentioned hollow walls, and no numerous superposed glass plates are necessary.

According to a further feature of the invention a heavy regulating rheostat is provided for said powerful bulb permitting finest regulation of light from complete darkness to full power of 1500 watts. This heavy rheostat is also made use of for stabilizing the device. With this object in view said rheostat is arranged with its center of gravity in the lower half of said box.

At the other hand according to a further feature of the invention the rheostat is offset laterally from the bulb, i. e. is not arranged behind the bulb. Therefore by the rheostat the possibility of having the bulb at a long distance from the film support is not impaired.

Very small and correspondingly light regulating devices are known for apparatuses with vertical film support but are arranged axially behind the bulb. None of the above advantages of the new device can be obtained by such known devices.

According to a further feature of the invention the column-like new device is supported on the floor by small rollers or wheels and preferably by caster wheels so that the device, which is stable—because of its low center of gravity—, may be moved, without danger of tipping over around the wards and even through the narrowest passages. At any point the device can be used conveniently by itself without need for an additional support, table, desk or the like.

In the accompanying drawing:

Fig. 1 is a front view of the device.

Fig. 2 is a vertical section through the device shown in Fig. 1.

Fig. 3 is a plan view of the device shown in Fig. 1.

The box or casing 1 has the form of a vertical column or German cast iron stove and consists of sheet metal. The upright walls of such box are provided for the greater part of their height with an insulating lining 2 of asbestos or the like. For clearer demonstration part of such lining has been shown broken away in Fig. 2. The casing or box is supported on the ground by small rollers or wheels 3, preferably caster wheels as shown. Therefore the bottom 4 of the box or casing is situated about five cm. above the floor or ground.

Substantially at the upper end the casing is closed by a film support in the form of a horizontal or substantially horizontal light diffusing glass plate 5, preferably of bluish color. In some distance beneath this plate preferably is arranged another light diffusing plate 6 consisting of frosted glass or the like. Beneath this second plate some air slots 7 are provided in the side walls of the box and are preferably shielded by shields 8 formed by upturning the material cut out from the sheet metal walls for forming said slots.

Immediately above the bottom 4 is arranged the electric light bulb 9 of more than 1000 watts and preferably of 1500 watts. Electric current is supplied to this lamp by the flexible cable 10 which may be provided with a switch plug (not shown) for connection with any mains.

For regulating the light emitted by the bulb a heavy rheostat 11 is provided which is controlled by a crank 12, the handle 13 of which projects outwardly through an arcuate slot 14 of the casing. The contact points of the rheostat are indicated at 15 in Fig. 1. Because of the heavy character of this rheostat finest regulation of light is possible from complete darkness to full power of 1500 watts.

The heavy character of the rheostat also makes it possible to use it as a weight for stabilizing the device. For this reason the rheostat is so located that its center of gravity 16 is in the lower half of the box.

As shown the rheostat is mounted separately from the bulb 9 on the casing 1 laterally offset from said bulb. Therefore no space behind the bulb 9 is necessary for the rheostat. Consequently the bulb 9 can be arranged as shown at the very bottom of the casing in a very long distance from the film support 5.

The field of view can be confined variably by two self-rolling curtains 17 and 18 which are known and need no special description.

The device is about 90 cm. high. The base is 37 by 37 cm., and the top is 52 by 52 cm.

Of course, these measures are only given by way of example and not for the purpose of limitation.

The physician can use the new device very conveniently while sitting at a desk or table and can use the device itself as a desk or table.

It has been found in extended practice that in spite of omission of special and complicated cooling devices the film is never overheated even at full power consumption of 1500 watts. The same is true of the casing.

The easy possibility of taking along the device has also been found a very considerable advantage.

I claim:

1. A device for reading X-ray films comprising a box in the form of an upright column of about the height of a table, an ordinary electric light bulb of more than 1000 watts near the bottom of said box, two plates permeable for light above said bulb, at least one of said plates having light diffusing qualities, one of said plates being arranged as a film support substantially horizontally at the upper end of said box for direct illumination by said bulb and being separated from the other plate by a heat insulating air space of substantial depth.

2. A device for reading X-ray films comprising a box in the form of an upright column of about the height of a table, an ordinary electric light bulb of more than 1000 watts near the bottom of said box, two plates permeable for light above said bulb, at least one of said plates having light diffusing qualities, one of said plates being arranged as a film support substantially horizontally at the upper end of said box for direct illumination by said bulb and being separated from the other plate by a heat insulating air space of substantial depth, and a heavy regulating rheostat for said bulb being arranged with its centre of gravity in the lower half of said box.

3. A device for reading X-ray films comprising a box in the form of an upright column of about the height of a table, an ordinary electric light bulb of more than 1000 watts near the bottom of said box, two plates permeable for light above said bulb, at least one of said plates having light diffusing qualities, one of said plates being arranged as a film support substantially horizontally at the upper end of said box for direct illumination by said bulb and being separated from the other plate by a heat insulating air space at substantial depth, and a heavy regulating rheostat for said bulb offset laterally from the bulb.

4. A device for reading X-ray films comprising a box in the form of an upright column of about the height of a table, an ordinary electric light bulb of more than 1000 watts near the bottom of said box, two plates permeable for light above said bulb, at least one of said plates having light diffusing qualities, one of said plates being arranged as a film support substantially horizontally at the upper end of said box for direct illumination by said bulb and being separated from the other plate by a heat insulating air space of substantial depth, and a heavy regulating rheostat for said bulb being arranged with its center of gravity in the lower half of said box and offset laterally from the bulb.

HENRY JORDAN.